US009624885B2

(12) United States Patent
Filippi et al.

(10) Patent No.: US 9,624,885 B2
(45) Date of Patent: Apr. 18, 2017

(54) VALVE ASSEMBLY WITH A GUIDING ELEMENT AND FLUID INJECTOR

(71) Applicant: Continental Automotive GmbH, Hannover (DE)

(72) Inventors: Stefano Filippi, Castel'Anselmo Collesalvetti (IT); Mauro Grandi, Leghorn (IT); Francesco Lenzi, Leghorn (IT); Valerio Polidori, Leghorn (IT)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 53 days.

(21) Appl. No.: 14/827,123

(22) Filed: Aug. 14, 2015

(65) Prior Publication Data
US 2016/0102639 A1   Apr. 14, 2016

(30) Foreign Application Priority Data

Oct. 14, 2014   (EP) .................................... 14188752

(51) Int. Cl.
*F02M 51/06*   (2006.01)
*F16K 1/54*   (2006.01)
(Continued)

(52) U.S. Cl.
CPC .... *F02M 51/0625* (2013.01); *F02M 51/0653* (2013.01); *F02M 61/08* (2013.01);
(Continued)

(58) Field of Classification Search
CPC ........ F02M 61/12; F02M 61/20; F02M 61/18; F02M 61/08; F02M 51/0625;
(Continued)

(56) References Cited

U.S. PATENT DOCUMENTS 2,756,106 A * 7/1956 Schenk .................. F02M 61/08
                                                           137/537
5,299,346 A   4/1994 Kilgore et al. ............... 29/33 K
(Continued)

FOREIGN PATENT DOCUMENTS

DE           1053244 B    3/1959   ............. F02M 61/08
DE   102004022619 A1   12/2005   ............. F02M 51/06
(Continued)

OTHER PUBLICATIONS

European Search Report, Application No. 14188752.1, 4 pages, Apr. 2, 2015.

*Primary Examiner* — Arthur O Hall
*Assistant Examiner* — Tuongminh Pham
(74) *Attorney, Agent, or Firm* — Slayden Grubert Beard PLLC

(57) ABSTRACT

A valve assembly includes a valve body, a valve needle and a first guiding element that axially guides the valve needle. The first guiding element is bottle shaped and is axially deformable at least in part. The first guiding element is fixedly coupled to the valve needle in a bottle neck section of the first guiding element, and coupled to the wall of the valve body in an axial end section of the first guiding element remote from the bottle neck section. Based on these features of the first guiding element, an axial displacement of the valve needle away from the closing position results in a widening of an outer shape of the first guiding element at least in a fixation section to press it against the wall of the valve body.

15 Claims, 4 Drawing Sheets

(51) Int. Cl.
*F16K 15/18* (2006.01)
*F16K 31/06* (2006.01)
*F02M 61/20* (2006.01)
*F02M 61/12* (2006.01)
*F02M 63/00* (2006.01)
*F02M 61/08* (2006.01)
*F16F 1/02* (2006.01)

(52) U.S. Cl.
CPC ............ *F02M 61/12* (2013.01); *F02M 61/20* (2013.01); *F02M 63/001* (2013.01); *F16F 1/028* (2013.01); *F16K 1/54* (2013.01); *F16K 15/18* (2013.01); *F16K 31/0655* (2013.01); *F02M 2200/26* (2013.01); *F02M 2200/8069* (2013.01); *F02M 2200/9053* (2013.01)

(58) Field of Classification Search
CPC ......... F02M 51/0635; F02M 2200/707; F02M 63/0057; F16K 27/029
USPC .................. 239/533.2, 533.7, 533.9, 533.11, 239/584–585.5, 590, 590.3, 453; 251/129.15, 118, 120, 122, 129.19
See application file for complete search history.

(56) References Cited

U.S. PATENT DOCUMENTS

| | | | |
|---|---|---|---|
| 6,626,372 B2 | 9/2003 | Boecking | ........................ 239/96 |
| 7,175,112 B2* | 2/2007 | Uhlmann | ............... F02M 61/20 |
| | | | 239/533.12 |
| 7,420,316 B2 | 9/2008 | Kienzler et al. | .............. 310/311 |
| 2011/0073071 A1 | 3/2011 | Smith | ........................... 123/445 |

FOREIGN PATENT DOCUMENTS

| | | | |
|---|---|---|---|
| EP | 1170502 A1 | 1/2002 | ............. F02M 47/00 |
| WO | 2004/097208 A1 | 11/2004 | ............. F02M 47/02 |
| WO | 2005/080786 A1 | 9/2005 | ............. F02M 51/00 |

* cited by examiner

VALVE ASSEMBLY WITH A GUIDING ELEMENT AND FLUID INJECTOR

CROSS-REFERENCE TO RELATED APPLICATIONS

This application claims priority to EP Application No. 14188752 filed Oct. 14, 2014, the contents of which are hereby incorporated by reference in their entirety.

TECHNICAL FIELD

The invention relates to a valve assembly for a fluid injector and to a fluid injector, e.g., an injector for injecting fuel into an internal combustion engine.

BACKGROUND

Injection valves are in widespread use, in particular for internal combustion engines where they may be arranged in order to dose the fluid into an intake manifold of the internal combustion engine or directly into the combustion chamber of a cylinder of the internal combustion engine.

Injection valves are manufactured in various forms in order to satisfy the various needs for the various combustion engines. Therefore, for example, their length, diameter as well as various elements of the injection valve which are responsible for the way the fluid is dosed may vary within a wide range. In addition to that, injection valves may accommodate an actuator for actuating a valve needle of the injection valve, which may, for example, be an electromagnetic actuator.

In order to enhance the combustion process with regard to the reduction of unwanted emissions, the respective injection valve may be suited to dose fluids under very high pressures. The pressures may be, in the case of a gasoline engine for example, in the range of up to 400 bar, and in the case of diesel engines in the range of up to 3500 bar.

WO 2005/080786 A1 describes a contact connection for contacting a valve needle of an internal combustion engine. The valve needle is guided in its upper part in a needle guide, which is a one-pieced component integrated within a valve body, isolated from its surroundings.

U.S. Pat. No. 5,299,346 describes an apparatus to align, burnish and secure an upper needle guide for a fuel injector valve body. The apparatus includes a lower portion having a fixture containing a spring-loaded plunger and a spring-loaded centering pin, and an upper portion having a burnishing tool, a spring-loaded stripper, and a crimping ram. The fixture aligns the needle guide and the valve body, and as the two portions are operated closed, the inside diameter of the upper needle guide is first burnished, and then the valve body is crimped onto the needle guide. The stripper holds the crimped parts against the lower portion of the apparatus while the upper and lower portions are operated open to withdraw the burnishing tool from the inside diameter of the needle guide.

EP 1 170 502 A1 describes an injector for injecting fuel into combustion chambers of internal combustion engines, comprising a control part protruding into a control space. The control part is guided in a guide sleeve surrounding the control space. The guide sleeve loaded by a spring element lies on a housing wall of the injector. The guide sleeve is centered on the first diameter region of the control part.

SUMMARY

One embodiment provides a valve assembly for a fluid injector, the valve assembly comprising: a valve body and a valve needle, the valve body having a longitudinal axis and comprising a cavity with a valve seat, the cavity being limited by a wall of the valve body, the valve needle being received in the cavity, the cavity and the valve needle interacting to prevent an injection of fluid from the cavity to the outside of the injector in a closing position of the valve needle, in which closing position the valve needle is seated on the valve seat, and to enable the injection of fluid when the valve needle is spaced apart from the closing position, and a first guiding element for axially guiding the valve needle, wherein the first guiding element is configured and arranged such that an axial displacement of the valve needle away from the closing position results in a widening of an outer shape of the first guiding element at least in a fixation section to press it against the wall of the valve body, as a result of the first guiding element being bottle shaped and being axially deformable at least in part, being fixedly coupled to the valve needle in a bottle neck section of the first guiding element, and being coupled to the wall of the valve body in an axial end section of the first guiding element remote from the bottle neck section.

In a further embodiment, the first guiding element comprises a spring sleeve having the bottle shape and being fixedly coupled to the valve needle in the bottle neck section.

In a further embodiment, the first guiding element comprises a fixing ring which is radially arranged between the valve needle and the spring sleeve for fixedly coupling the spring sleeve to the valve needle in the bottle neck section.

In a further embodiment, the wall of the valve body comprises a guide seat for axially limiting an axial displacement of the first guiding element relative to the valve body, wherein the first guiding element is operable to be seated on the guide seat with its axial end section in a way that an axial displacement of the valve needle away from the closing position results in an axial deformation of at least a part of the first guiding element, causing the outer shape of the first guiding element to widen.

In a further embodiment, the first guiding element is at least in part elastically deformable.

In a further embodiment, the first guiding element is at least in part made of metal.

In a further embodiment, the first guiding element comprises a plurality of slots.

In a further embodiment, a shape of each of the slots extends transversely to the longitudinal axis when the first guiding element is in an undeformed state.

In a further embodiment, a lateral extension of the shape of each of the slots is between 2 mm and 7 mm when the first guiding element is in an undeformed state.

In a further embodiment, an axial interval, at which the slots are spaced apart from each other is between 0.2 mm and 0.8 mm when the first guiding element is in an undeformed state.

In a further embodiment, a lateral interval, at which the slots are spaced apart from each other is between 0.4 mm and 1 mm when the first guiding element is in an undeformed state.

In a further embodiment, a width of the first guiding element axially changes from the bottle neck section towards the axial end section, particularly from 2.5 mm at the bottle neck section to 7 mm at the axial end section.

In a further embodiment, an axial extension of the first guiding element is between 10 mm and 18 mm, particularly 15 mm.

In a further embodiment, a wall thickness of the first guiding element is between 0.3 mm and 0.9 mm, particularly 0.5 mm.

Another embodiment provides a fluid injector comprising a valve assembly as discussed above and an actuator assembly operable to exert a force for displacing the valve needle away from the closing position, wherein the first guiding element provides a force for biasing the valve needle towards the closing position, and wherein the actuator assembly is operable to displace the valve needle against the bias of the first guiding element.

BRIEF DESCRIPTION OF THE DRAWINGS

Example embodiments of the invention are explained below with reference to the drawings, in which.

DETAILED DESCRIPTION

Figure 1:
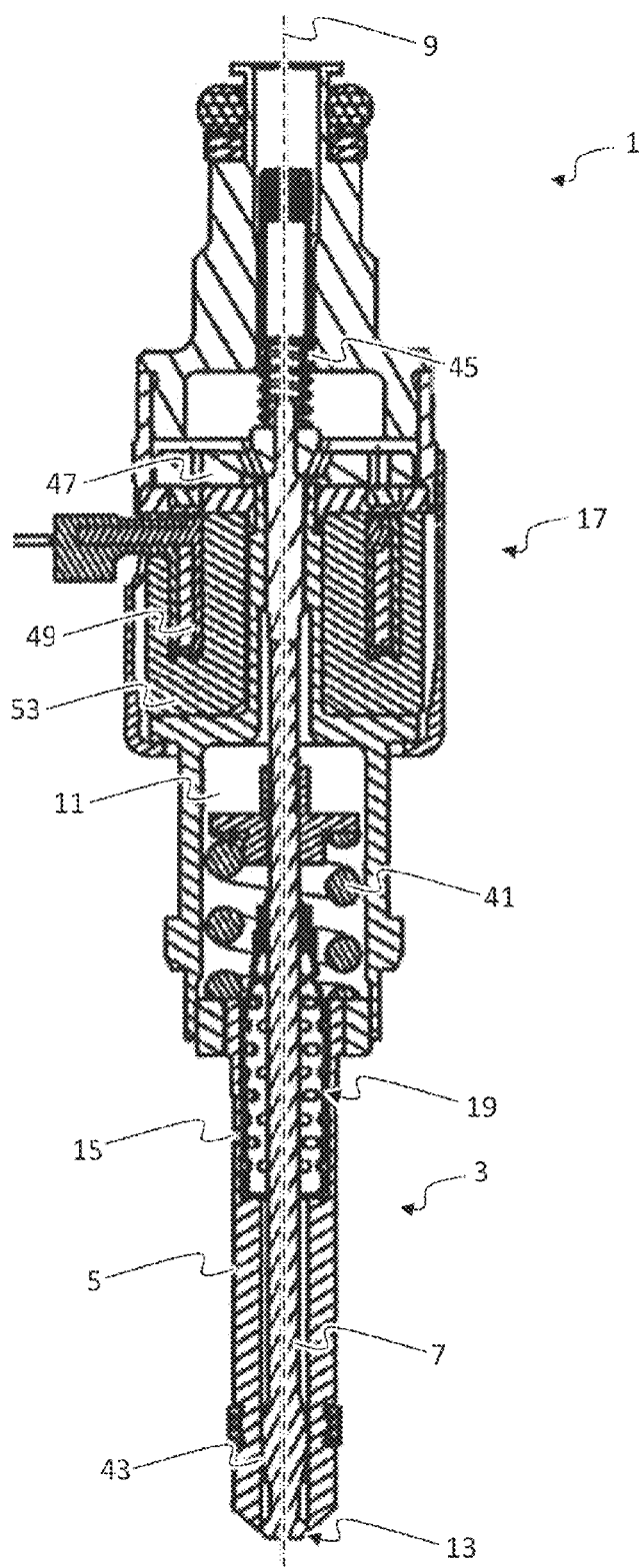
FIG. 1 shows a first embodiment of an injector in a longitudinal section view.

Embodiments of the invention provide a valve assembly providing a reliable and precise function of a fluid injector.

Some embodiments provide a valve assembly for a fluid injector. Other embodiments provide a fluid injector comprising the disclosed valve assembly.

The valve assembly has a valve body and a valve needle. The valve body has a longitudinal axis and comprises a cavity with a valve seat. The cavity is limited by a wall of the valve body. The valve seat is in particular comprised by a surface of the wall which defines the cavity. The valve needle is received in the cavity. Furthermore, the cavity and the valve needle are interacting to prevent an injection of fluid from the cavity to external to the valve assembly or the injector, respectively—i.e. to the outside of the valve assembly or the injector, respectively—in a closing position of the valve needle. In the closing position, the valve needle is seated on the valve seat. Moreover, the cavity and the valve needle are interacting to enable the injection of fluid when the valve needle is spaced apart from the closing position.

According to one embodiment, the injector further comprises an actuator assembly which is operable to exert a force for influencing a position of the valve needle. In particular, the actuator assembly is operable to displace the valve needle away from the closing position.

The valve assembly further comprises a first guiding element for axially guiding the valve needle. The first guiding element is bottle shaped and at least in part axially deformable. The first guiding element is coupled in a fixed way to the valve needle in a bottle neck section of the first guiding element. It is further coupled to the wall of the valve body in an axial end section of the first guiding element, which is facing away from the bottle neck section.

The first guiding element may expediently be configured and arranged in a way such that an axial displacement of the valve needle away from the closing position results in a widening of an outer shape of the first guiding element at least in a fixation section to press it against the wall of the valve body. This is in particular achieved by means of the bottle shape, the deformability of the first guiding element and by means of its coupling with the valve needle and the valve body.

A guiding of the valve needle contributes to a controlled spray formation of injected fluid. Due to its widening when axially compressed, the first guiding element enables a compensation of a manufacturing variability of a component such as the valve needle or the cavity. This contributes to a cost-efficiency of the injector. Moreover, using such first guiding element, a precision of guiding is achieved that allows for reducing a diameter of a sealing area of the injector.

The outer shape of the first guiding element is in particular defined by an outer diameter of the first guiding element. That the first guiding element is "bottle shaped" means in particular, that it has a smooth and curved outer shape—i.e. in particular without kinks or steps—that gradually reduces its cross section in the course from the fixation section to the bottle neck section which is in particular a second axial end section of the first guiding element, remote from the first axial end section where it is coupled to the wall of the valve body. The first guiding element is preferably in the basic shape of a hollow body of revolution. The first guiding element has in particular an outer diameter which decreases gradually from the fixation section to the bottle neck section. In one embodiment, the outer contour has a belly which is arranged in the region of the fixation section. In particular, the outer diameter of the first guiding element increases from the first axial end section to the fixation section. Preferably, it is larger in the first axial end section than in the bottle neck section. The fixation area may comprise the maximum outer diameter of the first guiding element in one development. The bottle shape of the first guiding element contributes to a widening upon axial compression especially in its fixation section, thus pressing against the wall of the valve body and providing guiding functionality.

According to one embodiment, the first guiding element comprises a spring sleeve which has the bottle shape. The spring sleeve is fixedly coupled to the valve needle in the bottle neck section. Advantageously, the spring sleeve contributes to the guiding functionality due to its axial and radial deformability.

According to a further embodiment, the first guiding element comprises a fixing element which fixedly couples the spring sleeve to the valve needle in the bottle neck section. The fixing element is in particular a fixing ring. The fixing element is in particular arranged radially between the valve needle and the spring sleeve. Preferably, it has an inner side surface which contacts the valve needle and an outer side surface which contacts the spring sleeve. The fixing element may expediently be fixed to the valve needle and to the spring sleeve, in particular at its inner and outer surface, respectively. The fixing element enables an easy and reliable way to fixedly couple the spring sleeve to the valve needle.

According to a further embodiment, the wall of the valve body comprises a guide seat for axially limiting an axial displacement of the first guiding element relative to the valve body. The first guiding element is operable to be seated on the guide seat with its axial end section in a way that an axial displacement of the valve needle away from the closing position results in an axial deformation of at least a part of the first guiding element, causing the outer shape of the first guiding element to widen.

Advantageously, the guide seat provides an easy and cost-saving way to achieve an axial compression of the first guiding element when the valve needle is displaced away from the closing position.

According to a further embodiment, the first guiding element is at least in part elastically deformable. Advantageously, this contributes to a reliable function of the first guiding element.

According to a further embodiment, the first guiding element is at least in part made of metal. In particular the spring sleeve and/or the fixing element may be metallic. Advantageously, this contributes to a reliable function of the first guiding element.

According to a further embodiment, the first guiding element comprises a plurality of slots. Advantageously, this contributes to an adjustable deformability of the first guiding element, influencing its overall stiffness independently from its overall size.

According to a further embodiment, a shape of each of the slots extends transversely to the longitudinal axis when the first guiding element is in an undeformed state. Advantageously, this contributes to a satisfactory axial deformability and/or buckling resistance with respect to rotation around the longitudinal axis of the first guiding element.

According to a further embodiment, a lateral extension of the shape of each of the slots is between 2 mm and 7 mm when the first guiding element is in an undeformed state.

According to a further embodiment, an axial interval at which the slots are spaced apart from each other is between 0.2 mm and 0.8 mm when the first guiding element is in an undeformed state.

According to a further embodiment, a lateral interval at which the slots are spaced apart from each other is between 0.4 mm and 1 mm when the first guiding element is in an undeformed state. The limits of the given regions are included in each case. Advantageously, this contributes to the deformability of the first guiding element.

According to a further embodiment, a width of the outer shape of the first guiding element—i.e. in particular the outer diameter—changes in axial direction from the bottle neck section towards the axial end section, particularly from a value between 1.5 mm and 3.5 mm—e.g. 2.5 mm—at the bottle neck section to a value between 6 mm and 8 mm—e.g. 7 mm—at the first axial end section when the first guiding element is in an undeformed state. The limits of the given regions are included in each case. Advantageously, this enables the first guiding element to reliably radially deform outwards in order to press against the wall of the valve body.

According to a further embodiment, an axial extension of the first guiding element is between 10 mm and 18 mm, the limits being included, when the first guiding element is in an undeformed state. For example, the axial extension has a value of 15 mm.

Advantageously, this contributes to an overall stiffness of the first guiding element.

According to a further embodiment, a wall thickness of the first guiding element is between 0.3 mm and 0.9 mm, the limits being included, when the first guiding element is in an undeformed state. For example, the wall thickness has a value of 0.5 mm. Advantageously, this contributes to an overall stiffness of the first guiding element.

According to a further embodiment, the first guiding element provides a force for biasing the valve needle towards the closing position, in particular by its coupling with the valve needle and the valve body. Expediently, it may be precompressed in the valve assembly to provide the force. The actuator assembly is operable for displacing the valve needle away from the closing position against the bias of the first guiding element.

Advantageously, this contributes to a leak tightness of the injector when the valve needle is in the closing position. In this case, an additional valve spring for biasing the valve needle towards the closing position is merely optional or can be dispensed with completely in this case, thus contributing to a cost-efficiency of the injector. The injector may however additionally comprise such a valve spring, wherein the actuator assembly is operable for displacing the valve needle away from the closing position against the bias of the valve spring and the first guiding element. The preload of the valve spring may be adjustable, for example by means of a calibration tube. In this way, the opening and closing characteristics of the valve assembly can be easily adjustable.

Furthermore, the injector may also comprise a second guiding element for axially guiding the valve needle, being axially displaced to the first guiding element. The second guiding element may expediently be positioned adjacent to the valve seat. Advantageously, this contributes to a coaxiality of the valve needle with respect to the valve body and the longitudinal axis, thus enabling a controlled spray formation of injected fluid.

FIG. 1 shows a first embodiment of an injector 1 with a valve assembly 3 and an actuator assembly 17. The valve assembly 3 comprises a valve body 5 and a valve needle 7. The valve body 5 has a longitudinal axis 9 and comprises a cavity 11 with a valve seat 13, wherein the cavity 11 is radially limited by a wall 15 of the valve body 5.

The valve needle 7 is received in the cavity 11 and axially movable relative to the valve body 5. The valve needle 7 is operable to prevent an injection of fluid in a closing position, in which the valve needle 7 is seated on the valve seat 13, from the cavity 11 to external to the injector 1, for example into a combustion chamber. The valve needle 7 is further operable to enable the injection of fluid when it is apart from the closing position. The injector 1 may comprise a valve spring 41 for biasing the valve needle 7 towards the closing position, for example in order to contribute to a leak tightness of the injector 1. The injector 1 may also comprise a calibration spring 45 being operable to axially bias the valve needle 7.

In this embodiment, the actuator assembly 17 is an electromagnetic actuator assembly, comprising a magnetic coil 49, in particular solenoid, positioned in a housing 53 and an armature 47, together forming a magnetic circuit when the magnetic coil 49 is energized. In other embodiments, the actuator assembly 17 may be for example a piezo-electric actuator assembly. The actuator assembly 17 is operable to exert a force on the valve needle 7 in order to influence a position of the valve needle 7. Particularly, the valve needle 7 may be axially displaced by the actuator assembly 17 relative to the valve body 5, for example in reciprocating fashion.

The injector 1 comprises a first guiding element 19 in order to limit a radial displacement of the valve needle 7 relative to the longitudinal axis 9 and to stabilize its axial movement. The injector 1 may additionally comprise a second guiding element 43, axially displaced to the first guiding element 19 that contributes to a further stabilization of the axial movement of the valve needle 7. In particular, stability of the axial movement of the valve needle 7 within the wall 15 of valve body 5 is critical for a spray formation during the injection. The second guiding element 43 may be constructed analoguous to the first guiding element 19 or differently. In the present embodiment, the second guiding element 43 is represented by longitudinal bars protruding laterally from a shaft of the valve needle 7 in a region axially adjacent to—but axially spaced apart from—the valve seat 13. In other embodiments, the second guiding element 43 may be removed.

The first guiding element 19 is bottle shaped, fixed to the valve needle 7 and coupled to the wall 15, such that an axial displacement of the valve needle 7 away from the closing position results in a widening of an outer shape of the first guiding element 19, causing it to be at least partially pressed against the wall 15. In order to achieve the widening of its outer shape, the first guiding element 19 is at least partially plastically deformable.

Figure 2:
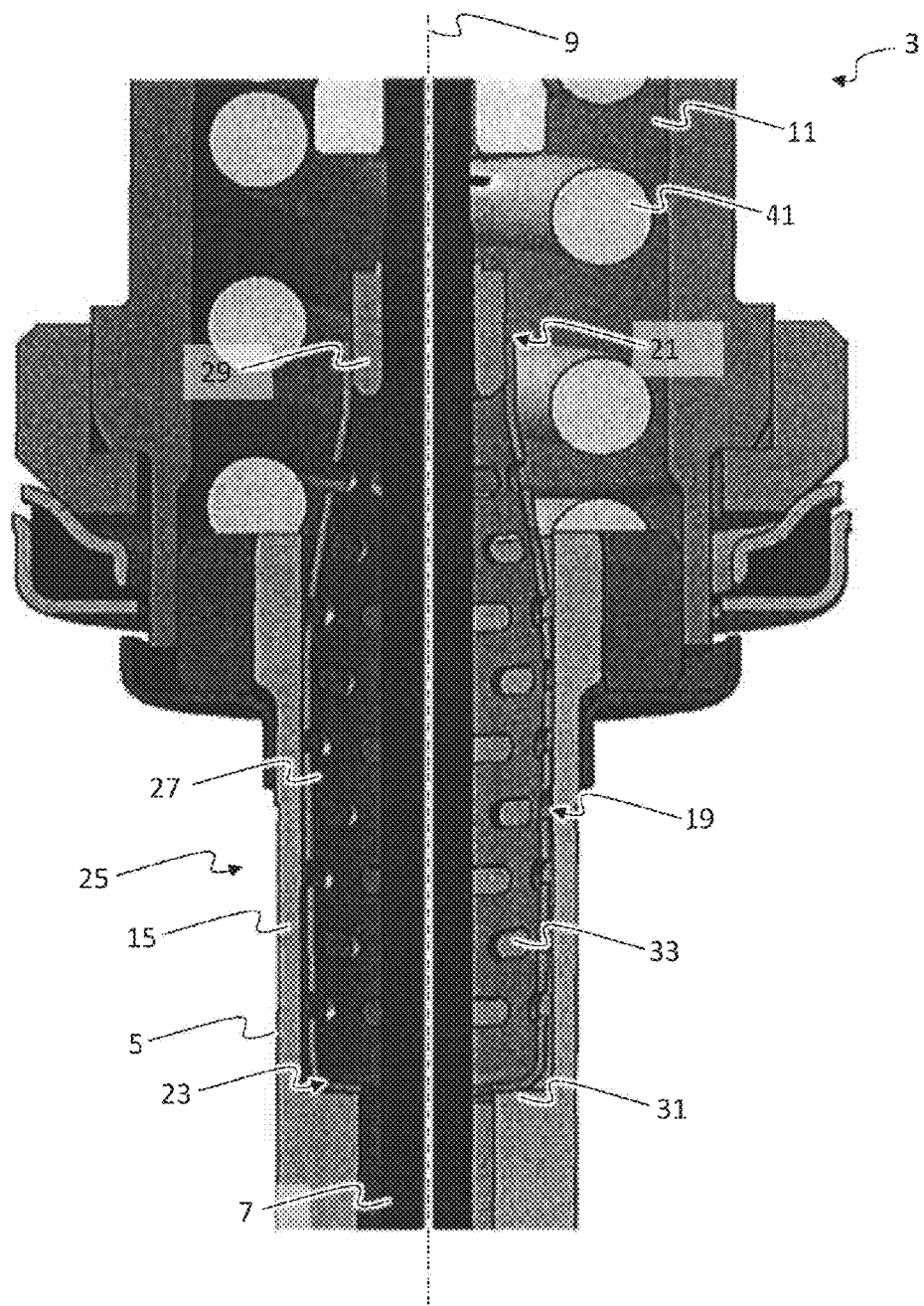
FIG. 2 shows an enlarged longitudinal section view of the injector according to FIG. 1.

FIG. 2 shows an enlarged longitudinal section view of the injector 1 according to the first embodiment, particularly of the valve assembly 3. The first guiding element 19 comprises a spring sleeve 27 which, for example, is constructed as a tubular spring. The spring sleeve 27 is bottle shaped, with a bottle neck section 21 and an axial end section 23 (in the preceding description also denoted as first axial end section), facing away from the bottle neck section 21. The spring sleeve 27 is, for example, elastically deformable. For example, it is made of spring steel. In this context, the spring sleeve 27 may comprise a plurality of slots 33 for increasing a deformability of the spring sleeve 27.

The spring sleeve 27 is fixedly coupled to the valve needle 7 in the bottle neck section 21. The first guiding element 19 may comprise a fixing element 29 for this reason, which, for example, is ring shaped. In this embodiment, the fixing element 29 is surrounding the valve needle 7 and fixedly coupled with it, wherein the spring sleeve 27 is surrounding the valve needle 7, coating at least partially the fixing element 29. An outer shape of the spring sleeve 27 may be narrowing towards the fixing element 29 in this context. In other embodiments, the fixing element 29 may at least partially coat the spring sleeve 27. Alternatively, the spring sleeve may be coupled directly to the valve needle 7, without an additional fixing element 29.

In this embodiment, the spring sleeve 27, the fixing element 29 and the valve needle 7 are fixedly coupled by welding, for example a laser spot welding. In other embodiments, a press-fit or clamping is established in order to couple the spring sleeve 27 to the valve needle 7 in a fixed way.

The wall 15 comprises a guide seat 31 for limiting an axial displacement of the first guiding element 19. A diameter of the cavity 11 may be decremented, in particular in stepped fashion, at the guide seat 31 in order to provide a seating surface for the first guiding element 19. Particularly, the first guiding element 19 is operable to be seated on the guide seat 31 with its axial end section 23, for example on said seating surface.

Due to a fixation of the first guiding element 19 at its bottle neck section 21, together with the valve seat 31 axially limiting a displacement of the first guiding element 19, an axial displacement of the valve needle 7 results in an axial compression of the spring sleeve 27.

The axial compression of the spring sleeve 27 causes a widening of its outer shape at least in a fixation section 25 that is then pressed against the wall 15. In particular, the fixation section 25 is arranged between the guide seat 31 and an axial end of the wall 15, directed inwards with respect to the injector 1. Thereby, a guiding of the valve needle 7 is obtained, limiting a radial displacement of the valve needle 7. Advantageously, a geometrical run-out variability in respect of the valve needle 7 and the cavity 11 is compensated, thus contributing to a particular precise coaxiality of the valve needle 7 with respect to the wall 15 and the longitudinal axis 9. Particularly, no special tight tolerance of the valve needle 7, the valve body 5 and their position with respect to the second guiding element 43 is required, because the first guiding element 19 compensates their geometrical variability.

Due to the axial compression of the spring sleeve 27, a force is exerted on the valve needle 7, biasing the valve needle 7 towards the closing position. Advantageously, the valve spring 41 is merely optional in this case.

Figure 3:
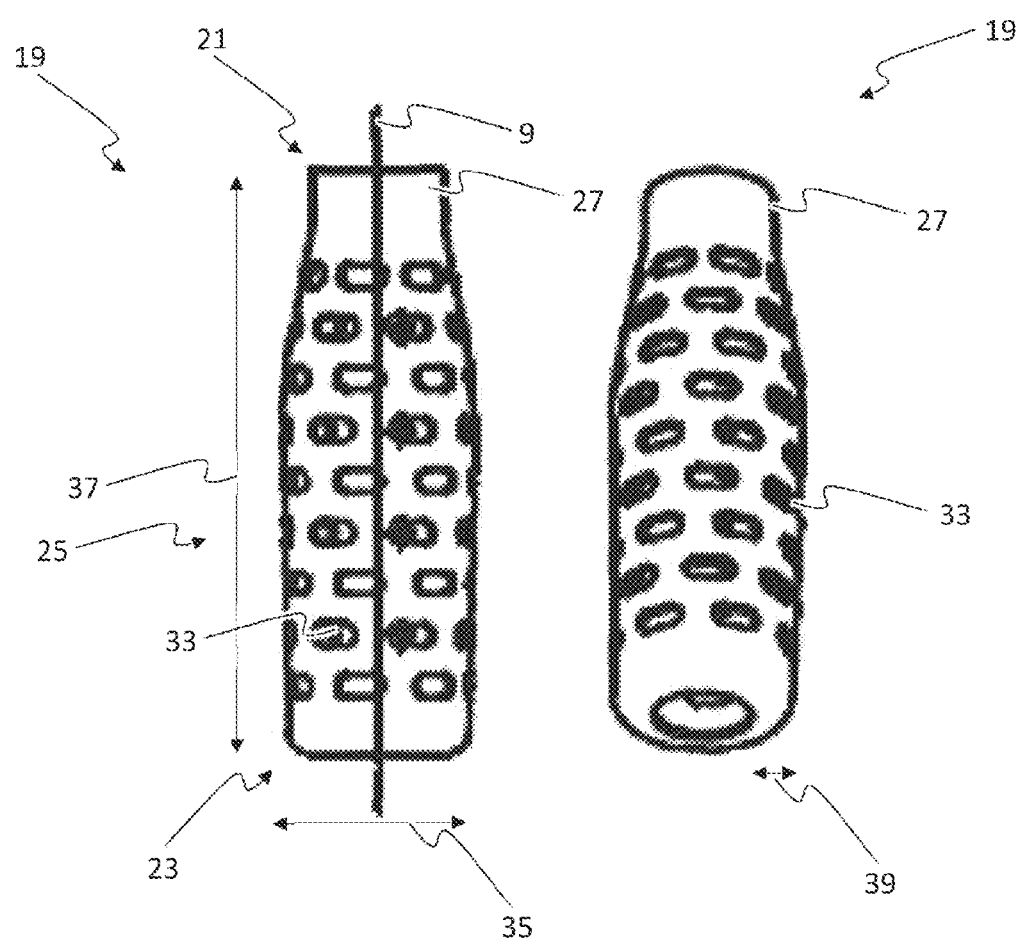
FIG. 3a shows a first guiding element of the injector according to FIG. 1 in a front view.
FIG. 3b shows the first guiding element of the injector according to FIG. 1 in a perspective view.

FIG. 3a shows the first guiding element 19 according to the first embodiment in a front view. In order to provide axial deformability, particularly axial compressibility, the spring sleeve 27 is elastically deformable. It is further made of metal. Moreover, it comprises the plurality of slots 33.

In an undeformed state of the spring sleeve 27, each of the slots has a shape that extends transversely to the longitudinal axis 9. This contributes to the axial deformability of the spring sleeve 27 and its radial expansion. A lateral extension of the shape of each of the slots 33 is for example between 2 mm and 7 mm in the undeformed state of the spring sleeve 27. The slots 33 are spaced apart from each other at an axial interval. The axial interval is between 0.2 mm and 0.8 mm in the undeformed state of the spring sleeve 27. Furthermore, the slots 33 are spaced apart at a lateral interval that is between 0.4 mm and 1 mm in the undeformed state of the spring sleeve 27. Additionally, the slots 33 may be staggered. These provisions contribute to the axial deformability of the spring sleeve 27 and influence its overall stiffness.

In the bottle neck section 21 and/or the axial end section 23, the spring sleeve 27 may be constructed solid, i.e. free of slots 33. Advantageously, this contributes to the a particularly good connectability of the first guiding element 19, particularly in view of a coupling of the spring sleeve 27 to the valve needle 7, respectively to the wall 15.

In order to achieve a radial widening of its outer shape in the fixation section 25, the first guiding element 19 is bottle shaped, that is, its width 35 axially increases from the bottle neck section 21 towards the axial end section 23. In particular, an outer shape of the first guiding element 19 in the fixation section 25 is globular bellied. In this embodiment, the width 35 of the first guiding element 19 is 2.5 mm at the bottle neck section 21 and 7 mm at the axial end section 23.

An axial extension 37 of the first guiding element 19 is 15 mm. A wall thickness 39 of the first guiding element 19 (shown in FIG. 3b) is 0.5 mm.

Typically, a reduction of a diameter of a sealing area of the injector 1 is limited due to a required high manufacturing accuracy of the valve body 5, the valve needle 7 and the guiding elements 19, 43. Furthermore, the reduction of the diameter of the sealing area is limited due to a high hydraulic force on a tip of the valve needle 7 and general sensitivity to pressure. Such a limit of the diameter may, for example, be between 3.7 mm to 3.8 mm.

Advantageously, such first guiding element 19 enables the reduction of the diameter of the sealing area of to, for example, 3 mm or lower, particularly also with the actuator assembly 17 being an electromagnetic actuator assembly. Moreover, an expensive and time-consuming grinding process of the valve needle 7 as described in FIG. 4 can be eliminated.

Injection valves are manufactured in various forms in order to satisfy the various needs for the various combustion engines. Therefore, in other embodiments, for example, their length, diameter as well as various elements of the injection valve which are responsible for the way the fluid is dosed may vary within a wide range. Hence, also dimensions of the first guiding element 19 such as its width 35, its axial extension 37 and its wall thickness 39 as well as the lateral extension of the shape of its slots 33 and the axial and tangential interval at which the slots 33 are arranged, may vary. However, a respective relation between each of these dimensions may preferably be kept constant. In particular, a deviation of the respective relation may be between 0% and 25%, particularly less than 10%.

Figure 4:
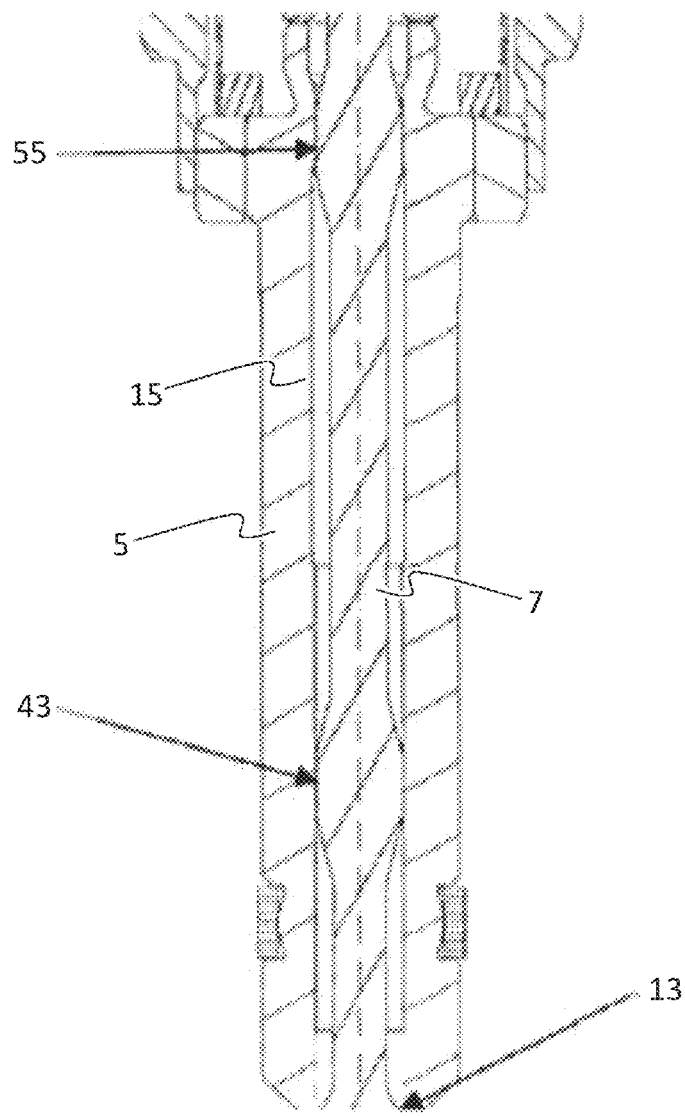
FIG. 4 shows a section of a longitudinal section view of a further embodiment of an injector.

FIG. 4 shows a section of a longitudinal section view of an injector according to another embodiment. The injector differs from injector 1 of the first embodiment with its further guiding element 55, which the valve needle 7 comprises instead of the first guiding element 19. The further guiding element 55 is, for example, constructed similar to the second guiding element 43. In order to achieve a very accurate gap between the guiding elements 55, 43 and the valve body 5, to avoid tilting or an instable position of the valve needle 7 during an opening and/or closing phase of the injection and to contribute to the spray formation, special grinding machines with associated long cycle time and process concepts are used to achieve a match grinding of the valve needle 7 after each single characterization of the valve body 5 and a double adaption of the guide to obtain a flow continuity through the injector 1. Such complicated processes and high accuracy are advantageously avoidably at least in part with the first guiding element 55 according to the present invention.

What is claimed is:

1. A valve assembly for a fluid injector, the valve assembly comprising:
   a valve body having a longitudinal axis and comprising a cavity with a valve seat, wherein the cavity is limited by a wall of the valve body,
   a valve needle received in the cavity,
   wherein the cavity and the valve needle interact to prevent an injection of fluid from the cavity in a closing position of the valve needle in which closing position the valve needle is seated on the valve seat, and to enable the injection of fluid from the cavity in an open position of the valve needle in which the valve needle is spaced apart from the closing position of the valve needle, and
   a first guiding element that axially guides the valve needle,
   wherein the first guiding element is:
     bottle shaped and being axially deformable at least in part,
     fixedly coupled to the valve needle in a bottle neck section of the first guiding element,
     coupled to the wall of the valve body in an axial end section of the first guiding element remote from the bottle neck section, and
     arranged such that an axial displacement of the valve needle away from the closing position of the valve needle results in a widening of an outer shape of the first guiding element at least in a fixation section to thereby press the first guiding element against the wall of the valve body.

2. The valve assembly of claim 1, wherein the first guiding element comprises a spring sleeve having the bottle shape and being fixedly coupled to the valve needle in the bottle neck section.

3. The valve assembly of claim 2, wherein the first guiding element comprises a fixing ring arranged radially between the valve needle and the spring sleeve, the fixing ring fixedly coupling the spring sleeve to the valve needle in the bottle neck section.

4. The valve assembly of claim 1, wherein the wall of the valve body comprises a guide seat that axially limits an axial displacement of the first guiding element relative to the valve body,
   wherein an axial end section of the first guiding element is configured to rest on the guide seat such that an axial displacement of the valve needle away from the closing position results in an axial deformation of at least a part of the first guiding element, thereby causing the outer shape of the first guiding element to widen.

5. The valve assembly of claim 1, wherein the first guiding element is at least in part elastically deformable.

6. The valve assembly of claim 1, wherein the first guiding element is at least partially formed of metal.

7. The valve assembly of claim 1, wherein the first guiding element comprises a plurality of slots.

8. The valve assembly of claim 7, wherein a shape of each slot extends transversely to the longitudinal axis in an undeformed state of the first guiding element.

9. The valve assembly of claim 8, wherein a lateral extension of the shape of each of the slots is between 2 mm and 7 mm in an undeformed state of the first guiding element.

10. The valve assembly of claim 7, wherein the slots are spaced apart from each other by an axial interval of between 0.2 mm and 0.8 mm in an undeformed state of the first guiding element.

11. The valve assembly of claim 7, wherein the slots are spaced apart from each other by a lateral interval of between 0.4 mm and 1 mm in an undeformed state of the first guiding element.

12. The valve assembly of claim 1, wherein a lateral width of the first guiding element increases from 2.5 mm at the bottle neck section to 7 mm at the axial end section.

13. The valve assembly of claim 1, wherein an axial extension of the first guiding element has a length of between 10 mm and 18 mm.

14. The valve assembly of claim 1, wherein the first guiding element has a wall thickness of between 0.3 mm and 0.9 mm.

15. A fluid injector, comprising:
    a valve assembly comprising:
      a valve body having a longitudinal axis and comprising a cavity with a valve seat, wherein the cavity is limited by a wall of the valve body,
      a valve needle received in the cavity,
      wherein the cavity and the valve needle interact to prevent an injection of fluid from the cavity in a closing position of the valve needle in which closing position the valve needle is seated on the valve seat, and to enable the injection of fluid from the cavity in an open position of the valve needle in which the valve needle is spaced apart from the closing position of the valve needle, and
      a first guiding element that axially guides the valve needle,
      wherein the first guiding element is:
        bottle shaped and being axially deformable at least in part,
        fixedly coupled to the valve needle in a bottle neck section of the first guiding element,
        coupled to the wall of the valve body in an axial end section of the first guiding element remote from the bottle neck section, and
        arranged such that an axial displacement of the valve needle away from the closing position of the valve needle results in a widening of an outer shape of the first guiding element at least in a fixation section to thereby press the first guiding element against the wall of the valve body, and
an actuator assembly configured to exert a force that displaces the valve needle away from the closing position, wherein the first guiding element provides a force that biases the valve needle towards the closing position, and wherein the actuator assembly is configured to displace the valve needle against the bias of the first guiding element.

* * * * *